Sept. 3, 1940.    J. R. REYBURN    2,213,593
REINFORCED LINK FOR ANTISKID CHAINS
Filed Oct. 11, 1939
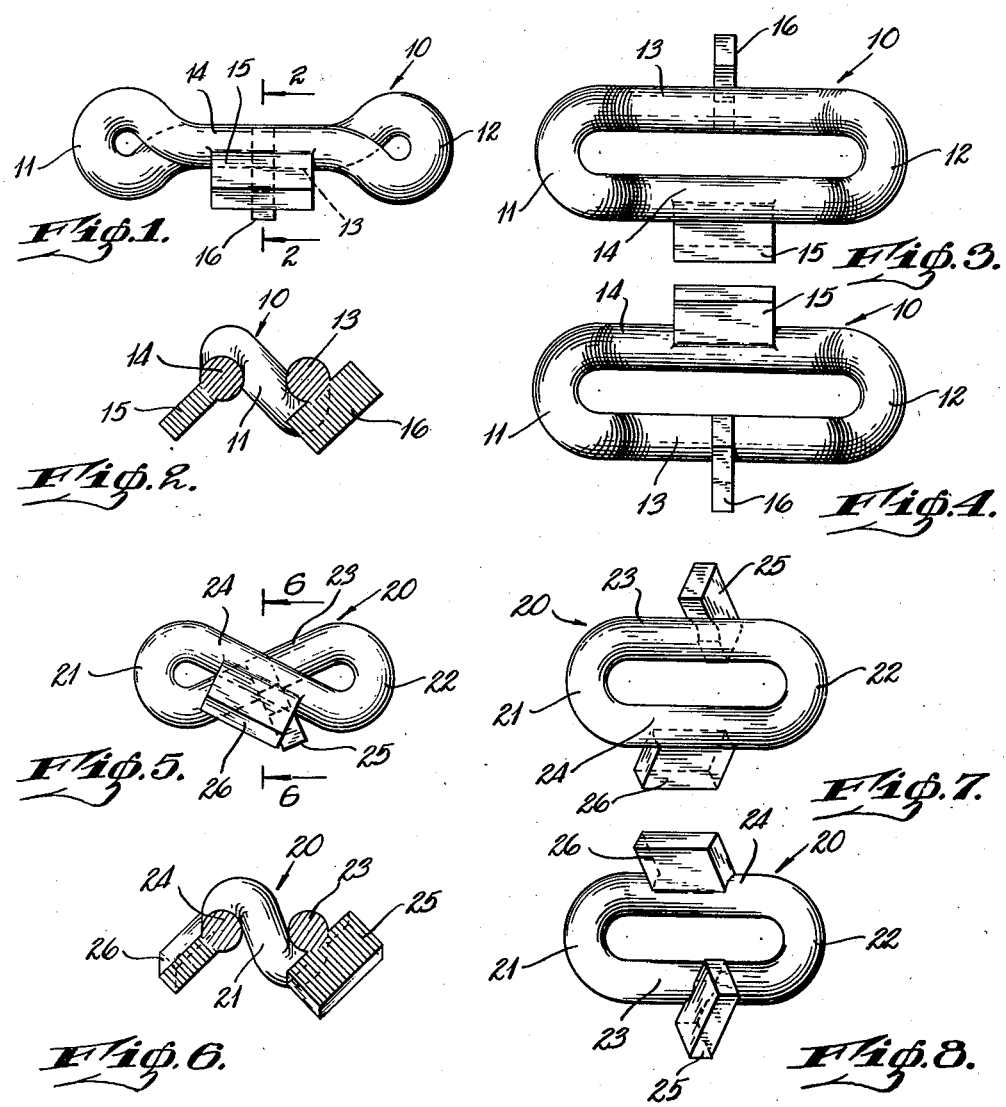
INVENTOR
JOHN R. REYBURN
BY
ATTORNEY Patented Sept. 3, 1940

2,213,593

UNITED STATES PATENT OFFICE 2,213,593

REINFORCED LINK FOR ANTISKID CHAINS

John R. Reyburn, Fairfield, Conn., assignor to American Chain & Cable Company, Inc., New York, N. Y., a corporation of New York Application October 11, 1939, Serial No. 298,895

7 Claims. (Cl. 152—245)

This invention relates to improvements in reinforced links for antiskid tire chains and this application is a continuation in part of my copending application Ser. No. 132,279, filed March 22, 1937, now Patent No. 2,180,097, November 14, 1939. In addition to the objects of providing a tread link in a cross chain with caulks secured thereto in such position as to increase the over-all width of the links in proportion to the increase in height of the link and to present projections below the normal road engaging portions of the link to protect such portions and to increase traction and prevent slipping and side skidding, it is also an object to more effectively prevent side skidding, the construction being preferably such that the rear strand of the link is provided with a caulk that is most effective during traction and the front strand of the link with a caulk that is most effective to prevent side skidding.

Other objects of the invention will appear from the following description taken in connection with the drawing, in which, Fig. 1 is a side view of a link having its side strands arranged in the same plane, reinforced by caulks in accordance with my invention;

Fig. 2 is a cross section on the line 2—2 of Fig. 1;

Fig. 3 is a top plan view of the link shown in Fig. 1;

Fig. 4 is a bottom plan view thereof;

Fig. 5 is a side view of a curb link provided with caulks in accordance with my invention;

Fig. 6 is a cross section on the line 6—6 of Fig. 5;

Fig. 7 is a top plan view of the link shown in Fig. 5; and

Fig. 8 is a bottom plan view thereof.

For the purpose of disclosure I have illustrated in Figs. 1 to 4 a link having parallel side strands arranged in the same horizontal plane provided with caulks in accordance with my invention, and in Figs. 5 to 8 I have shown my invention applied to the ordinary form of the well known curb link.

Referring to Figs. 1 to 4, the link 10 comprises end connecting loops 11 and 12 and side strands 13 and 14. The side strands extend parallel to each other and are arranged in the same horizontal plane and held out of contact with the road by the end loops 11 and 12 which are twisted in opposite directions and disposed generally as are the connecting loops of curb links. These links are connected together end to end and may constitute the tread links of a cross chain or series of cross chains which may be secured to side chains in a well known manner or these cross chains may be secured in any other well known manner upon the tire.

In the use of the cross chain on a tire it is preferred to mount the chain so that the strand 13 is at the forward side of the link with respect to the direction of travel when the link engages the road, and the strand 14 on the rear side of the link. When traction is applied there is a tendency for the link 12 to rotate counterclockwise as viewed in Fig. 2 and in view of this I provide the strand 14 with a caulk 15 which not only projects downwardly beyond the ground engaging portion of the loops of the link but also rearwardly of the link so that effective traction may be had when the link assumes a rotated position. I prefer to use a caulk 15 of generally rectangular form with its length extending in the direction of the length of the side strand. This caulk extends at a plowing angle to the road and even under heavy traction forces which rotate the link these caulks will still extend in a direction to effectively dig into the road surface.

On the forward strand 13 of the link I secure a caulk 16 which is also preferably of rectangular from, the main plane of the caulk extending substantially right angularly to the main plane of the caulk 15, the caulk being welded at an intermediate point in one of its longer side edges on the side strand. The caulk is disposed so that its lower corner can bite into the road for traction purposes and so that its relatively large side faces are effective to prevent sidewise skidding. The lower corner of the caulk 16 also extends below the lowermost portions of the loops of the link.

As the caulks 15 and 16 extend below the lowermost portions of the loops of the link they are both effective to provide for traction and as the caulk 16 is disposed with its major plane at right angles to the strand 13 and in the line of travel, this caulk is most effective to prevent sidewise skidding. While the caulks increase the over-all height of the link, they also increase the width of the link as the caulk 15 projects rearwardly beyond the rear side of the link.

In Figs. 5, 6, 7 and 8 I have shown my invention applied to a curb link 20 provided with end loops 21 and 22 comprising tire and road engaging lobes and with side strands 23 and 24 which are oppositely inclined as is well known. It is preferable to mount the link on a tire in such a manner that the side strand 23 is on the front side of the link and the side strand 24 is on the rear side of the link, the front side strand 23 being provided with a caulk 25 bearing the same relation to its side strand as that of the caulk 16 to the side strand 13, in Figs. 1 to 4 and the rear side strand being provided with a caulk 26 bearing the same relation to its side strand 24 as that of the caulk 15 to the side strand 14 in Figs. 1 to 4. As disclosed in Fig. 5 the lowermost corners of the caulks 25 and 26 extend beyond the lowermost portions of the road engaging lobes of the link to effectively dig into ice and other hard surfaces on which the lobes of the link because of their configuration and size cannot be as effective as on softer surfaces.

I have disclosed my invention as applied to two types of links and as being preferably rectangular in form as disclosed but it is to be understood, of course, that my invention is not limited to the particular form of link disclosed or to the particular form of caulks which as is obvious might be of different shapes from that disclosed. It is to be understood therefore that I reserve the right to all such changes as fall within the principles of this invention and the scope of the appended claims.

I claim:

1. A reinforced link for a cross chain, including side strands and end connecting loops, and a plate-like caulk associated with each side strand, the caulk associated with one side strand lying in a plane extending parallel with the side strand, and the caulk associated with the other side strand lying in a plane intersecting said side strand.

2. A reinforced link for a cross chain, including side strands and end connecting loops having road engaging portions, a caulk associated with each side strand, said caulks diverging downwardly and projecting below said road engaging portions and having road engaging portions spaced at a greater distance from each other than the width of the link, at least one of said caulks being plate-like and disposed in a plane normal to the associated side strand and to the road.

3. A reinforced curb link for a cross chain, having oppositely inclined side strands and tire and road engaging lobes, a caulk associated with each side strand, said caulks diverging downwardly and projecting below said road engaging lobes and laterally outwardly beyond the sides of the link, at least one of said caulks being of plate-like form disposed in a plane normal to the road and to its associated side strand.

4. A reinforced curb link for a cross chain, comprising oppositely inclined side strands and tire and road engaging lobes, and a plate-like caulk welded to each side strand, the caulk associated with one of said side strands lying in a plane parallel to the strand and the caulk associated with the other side strand lying in a plane intersecting its side strand at substantially right angles.

5. A reinforced curb link for a cross chain, including oppositely inclined side strands and tire and road engaging lobes, and a plate-like caulk welded to each side strand, said caulks diverging downwardly and projecting below the road engaging lobes of the link, the caulk associated with the rear strand of the link with respect to the direction of travel being arranged in a plane parallel with its associated strand and the caulk associated with the forward strand of the link being arranged in a plane intersecting its associated strand.

6. A reinforced curb link for a cross chain, including oppositely inclined side strands and tire and road engaging lobes, and a plate-like caulk welded edgewise to each side strand, said caulks being of an elongated rectangular form and diverging downwardly and projecting below the road engaging portions of the link and laterally outwardly to present portions to the road spaced a greater distance apart than the outside faces of the side strands of the link, the caulk associated with the rear strand with respect to the direction of travel having one of its side edges paralleling the strand and welded thereto, and the caulk associated with the front side strand having one of its side edges extending crosswise of the strand and welded thereto.

7. A reinforced link for a cross chain, including side strands and end connecting loops having road engaging portions, a caulk secured to each side strand, said caulks diverging downwardly below said road engaging portions and laterally beyond the sides of the link, the caulk associated with the rear strand with respect to the direction of travel having its road engaging portion spaced at a greater distance from the longitudinal center line of the link than that of the caulk associated with the front strand.

JOHN R. REYBURN.